United States Patent [19]

Takuma et al.

[11] Patent Number: 5,432,552
[45] Date of Patent: Jul. 11, 1995

[54] AUTOMATIC FOCUSING APPARATUS INCLUDING IMPROVED DIGITAL HIGH-PASS FILTER

[75] Inventors: Masao Takuma, Toyonaka; Kiyotada Kawakami, Osaka, both of Japan

[73] Assignee: Sanyo Electric Co., Ltd., Japan

[21] Appl. No.: 144,718

[22] Filed: Oct. 28, 1993

[30] Foreign Application Priority Data

Nov. 4, 1992 [JP] Japan ................. 4-295109

[51] Int. Cl.⁶ ........................................... H04N 5/232
[52] U.S. Cl. ................................. 348/349; 348/354
[58] Field of Search ............... 348/345, 349, 352, 353, 348/354, 355, 356; 250/201.1, 201.2, 201.8; 354/400, 402; H04N 5/232

[56] References Cited

U.S. PATENT DOCUMENTS

| | | | |
|---|---|---|---|
| 4,320,417 | 3/1982 | Hanma et al. | 348/349 |
| 4,918,524 | 4/1990 | Ansari | 358/133 |
| 4,922,346 | 5/1990 | Hidaka et al. | 348/349 |
| 4,974,092 | 11/1990 | Kawamura et al. | 348/349 |
| 5,003,339 | 3/1991 | Kikuchi et al. | 354/402 |
| 5,077,613 | 12/1991 | Hirao et al. | 358/227 |
| 5,128,768 | 7/1992 | Suda et al. | 348/350 |
| 5,200,828 | 4/1993 | Jang et al. | 348/345 |

FOREIGN PATENT DOCUMENTS

| | | | |
|---|---|---|---|
| 2092191 | 3/1990 | Japan | H04N 17/00 |
| 3132172 | 6/1991 | Japan | H04N 5/232 |

*Primary Examiner*—Yon J. Couso
*Assistant Examiner*—Tuan V. Ho
*Attorney, Agent, or Firm*—Peter L. Michaelson

[57] ABSTRACT

An automatic focusing apparatus includes a focus lens, an image sensing circuit, a circuit for generating a focus evaluating value in response to a video signal from image sensing circuit, a hill-climbing control circuit, a focus motor for moving focus lens in response to a control signal from hill-climbing control circuit, and a circuit for detecting the position of focus motor. The focus evaluating value generating circuit includes an A/D converter, a digital HPF, a digital integrator for integrating the level of the high frequency component in a digital luminance signal in response to a control signal from an integration period setting circuit and sequentially supplies the resultant value as a focus evaluating value to the hill-climbing control circuit for every field, and a timer circuit for producing a reset signal at H level. Thus, after passage of prescribed time period from the end of the horizontal blanking period, a reset signal is applied to digital HPF, delay register in the digital HPF is set to zero, and the digital HPF is reset. Ringing due to a rising in the horizontal blanking period disappears, part of ringing will not be integrated, and therefore accurate automatic focusing operation can be performed.

6 Claims, 10 Drawing Sheets

PRIOR ART    FIG. 10
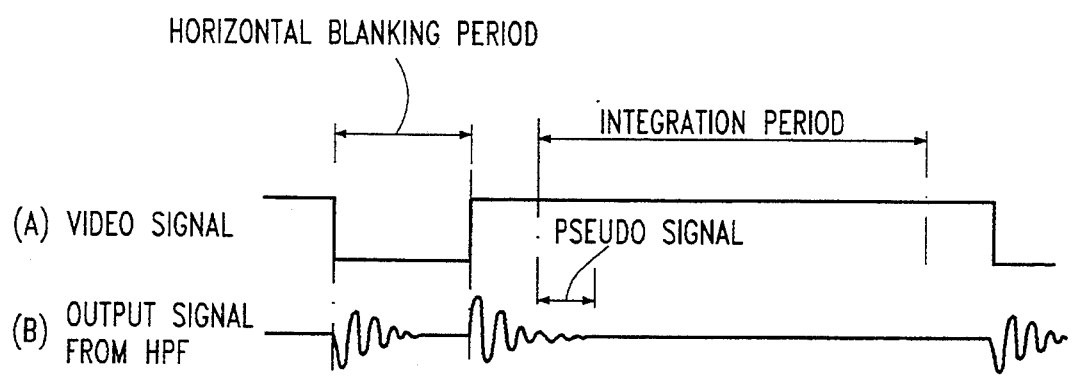
PRIOR ART    FIG. 11
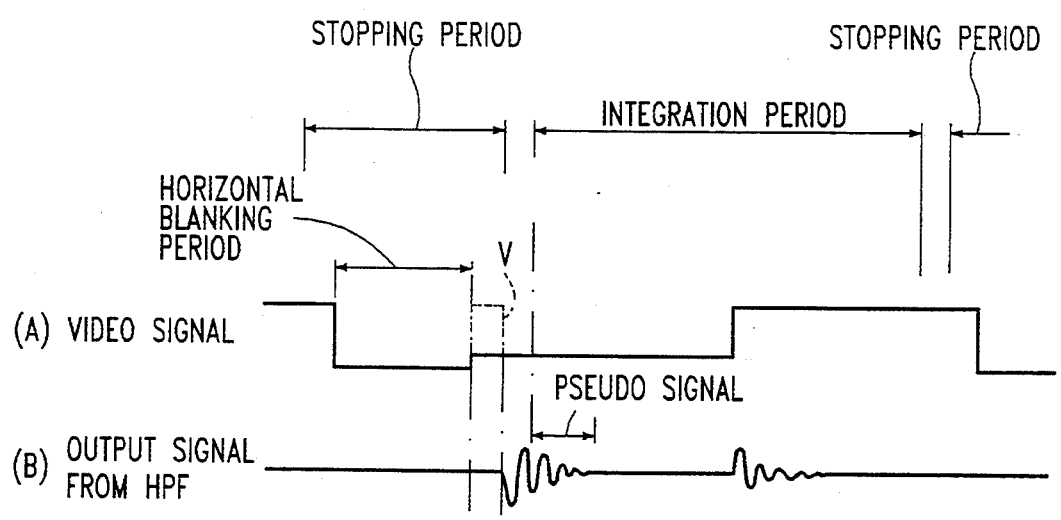

AUTOMATIC FOCUSING APPARATUS INCLUDING IMPROVED DIGITAL HIGH-PASS FILTER

BACKGROUND OF THE INVENTION

1. Field of the Invention

The present invention relates generally to automatic focusing apparatuses, and more specifically, to an automatic focusing apparatus for automatically matching the focus to an object in response to a video signal obtained from an image sensor, in an image sensing apparatus such as a video camera having an automatic focusing function.

2. Description of the Background Art

Conventionally, in an automatic focusing apparatus for use in an image sensing apparatus such as a video camera, an approach utilizing a video signal obtained from an image sensor itself for evaluation for the state of focus control has been developed. Such an approach is essentially free from parallax and possesses excellent characteristics that, for example, the focus can exactly be matched even if the depth of field is small and an object is located at a distance. Furthermore, according to this approach, a special sensor for automatic focusing does not have to be separately provided and therefore the apparatus is of a very simple mechanism.

As an example of such a focus control method utilizing a video signal, a so-called hill-climbing servo system has been conventionally known. An automatic focusing apparatus utilizing the hill-climbing servo system is disclosed, for example, in U.S. Pat. Nos. 4,922,346 and 5,003,339, and briefly stated, a high frequency component of a video signal from an image sensor is detected for every field as a focus evaluating value, the detected focus evaluating value is always compared with a focus evaluating value detected one field before, and a focus lens continues to be slightly vibrated so that the focus evaluating value always takes a maximum value.

In recent years, as digitization of signal processing circuitry, for example, in digital video tape recorders has developed, there are demands for digital automatic focusing circuitry.

For example, replacement of an analog high-pass filter (hereinafter referred to as HPF) in an automatic focusing circuit with a digital HPF is demanded. An infinite impulse response (IIR) filter would be suited for the digital HPF in such a case for its characteristic and in view of its circuit scale.

As illustrated in a timing chart in FIG. 10, for example, a video signal originally does not have a high frequency component when the picture plane is entirely white. Therefore, a digital HPF will output nothing in response to such a video signal.

However, the horizontal period (field period) of the video signal includes a horizontal blanking period for a horizontal retrace line, and the video signal has rising and falling edges before and after the horizontal blanking period. Accordingly, high frequency components for these edges are output from the digital HPF. Such a phenomenon is called ringing.

Especially when the digital HPF includes an IIR filter, an output signal from the HPF attenuates while ringing, but if the time constant of the HPF is large, integration is initiated before an output signal from the HPF is sufficiently attenuated. Thus, part of ringing is mixed into the focus evaluating value as a pseudo signal and adversely affects the focusing operation.

Meanwhile, when a signal processing circuit is digitized, power consumption is reduced. In that regard, a clock signal is supplied for operating the signal processing circuit only when it is necessary, and stopping the clock signal otherwise may be usually employed.

Therefore, an output signal from the HPF is not necessary other than in the period for integration in the automatic focusing circuit, and therefore as illustrated in FIG. 11, it is considered to provide a period for stopping the clock signal.

During the period in which the clock signal is stopped, the value of a delay register in the digital HPF does not change, and the delay register maintains the video signal level at a level that occurred immediately before the onset of the period during which the clock stopped period. Accordingly, if there is a difference between the level of a video signal immediately before the clock stopped period and the level of the video signal immediately after the clock stopped period, an edge V is substantially present at the end of the clock stopped period.

Under such a situation, a high frequency component due to edge V is output from the HPF similarly to the above-described case. If integration is initiated before the output signal from the HPF is sufficiently attenuated, part of the ringing is mixed into the focus evaluating value as a pseudo signal, similar to the above case, adversely affects the focusing operation.

SUMMARY OF THE INVENTION

It is an object of the invention to provide an automatic focusing apparatus capable of accurate automatic focusing operation.

Another object of the invention is to provide an automatic focusing apparatus with reduced power consumption.

Yet another object of the invention is to provide an automatic focusing apparatus which prevents part of ringing due to an edge, such as in a horizontal blanking period included in a video signal, from mixing into a focus evaluating value as a pseudo signal.

According to one aspect of the invention, an automatic focusing apparatus for automatically matching the focus to an object, briefly stated, includes a focus lens, an image sensing circuit, a digital high-pass filter, an integrating circuit, a control circuit, and a resetting circuit.

The image sensing circuit produces a video signal in response to incident light through the focus lens from the object. The digital high-pass filter extracts a high frequency component in the video signal produced by the image sensing circuit.

The integrating circuit integrates the level of the high frequency component extracted by the digital high-pass filter during a prescribed integration period exclusive of a horizontal blanking period, and sequentially supplies the resultant value for every field as a focus evaluating value which takes a maximum value at the in-focus position.

The control circuit controls the position of the focus lens relative to the image sensing circuit in the direction of optical axis in response to the focus evaluating value supplied from the integrating circuit.

The resetting circuit resets the digital high-pass filter during the period from the end of a horizontal blanking period to initiation of an integration period.

According to another aspect of the invention, an automatic focusing apparatus for automatically matching the focus to an object, briefly stated, includes a focus lens, an image sensing circuit, a digital high-pass filter, a stopping circuit, an integrating circuit, a control circuit, and a resetting circuit.

The stopping circuit stops operation of the digital high-pass filter during a prescribed stopping period including a horizontal blanking period.

The integrating circuit integrates the level of a high frequency component extracted by the digital high-pass filter during a prescribed integrating period exclusive of the stopping period, and sequentially supplies the resultant value for every field as a focus evaluating value which takes a maximum value at the in-focus position.

The resetting circuit resets the digital high-pass filter during the period from the end of a stopping period to an initiation of an integration period.

In the automatic focusing apparatus according to the invention, since the digital high-pass filter is reset during the period from the end of a horizontal blanking period to initiation of an integration period, part of the ringing due to an edge created during the horizontal blanking period can be prevented from mixing into the focus evaluating value as a pseudo signal, and therefore automatic focusing operation can be accurately performed.

In the automatic focusing apparatus according to the invention, since the operation of the digital high-pass filter is stopped during a prescribed stop period including a horizontal blanking period, power consumption can be reduced. Furthermore, since the digital high-pass filter is reset during the period from the end of a stopping period to initiation of an integration period, part of the ringing due to an edge in the stopping period can be prevented from mixing into the focus evaluating value as a pseudo signal, and accurate automatic focusing operation can be performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a timing chart for use in illustration of operation of an automatic focusing apparatus as a background art of the present invention; and FIG. 11 is a timing chart for use in illustration of operation of an automatic focusing apparatus as a background art of the invention.

DESCRIPTION OF THE PREFERRED EMBODIMENTS

Figure 1:
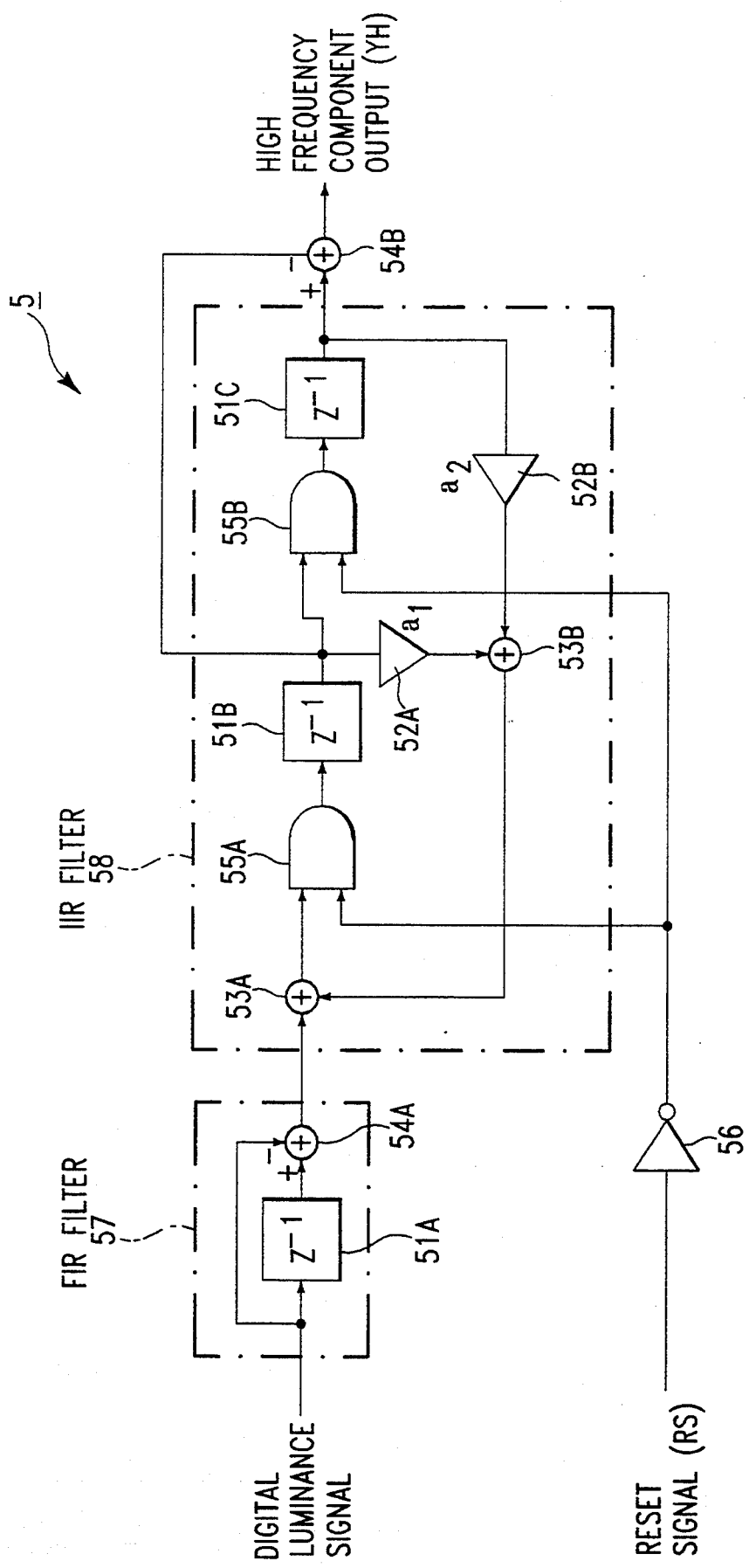
FIG. 1 is a block diagram showing the entire structure of a digital high-pass filter in an automatic focusing apparatus according to a first embodiment of the invention.

Now, embodiments of the invention will be described in detail in conjunction with the accompanying drawings. Note that portions designated with the same reference characters indicate the same or corresponding portions.

Embodiment 1

Figure 2:
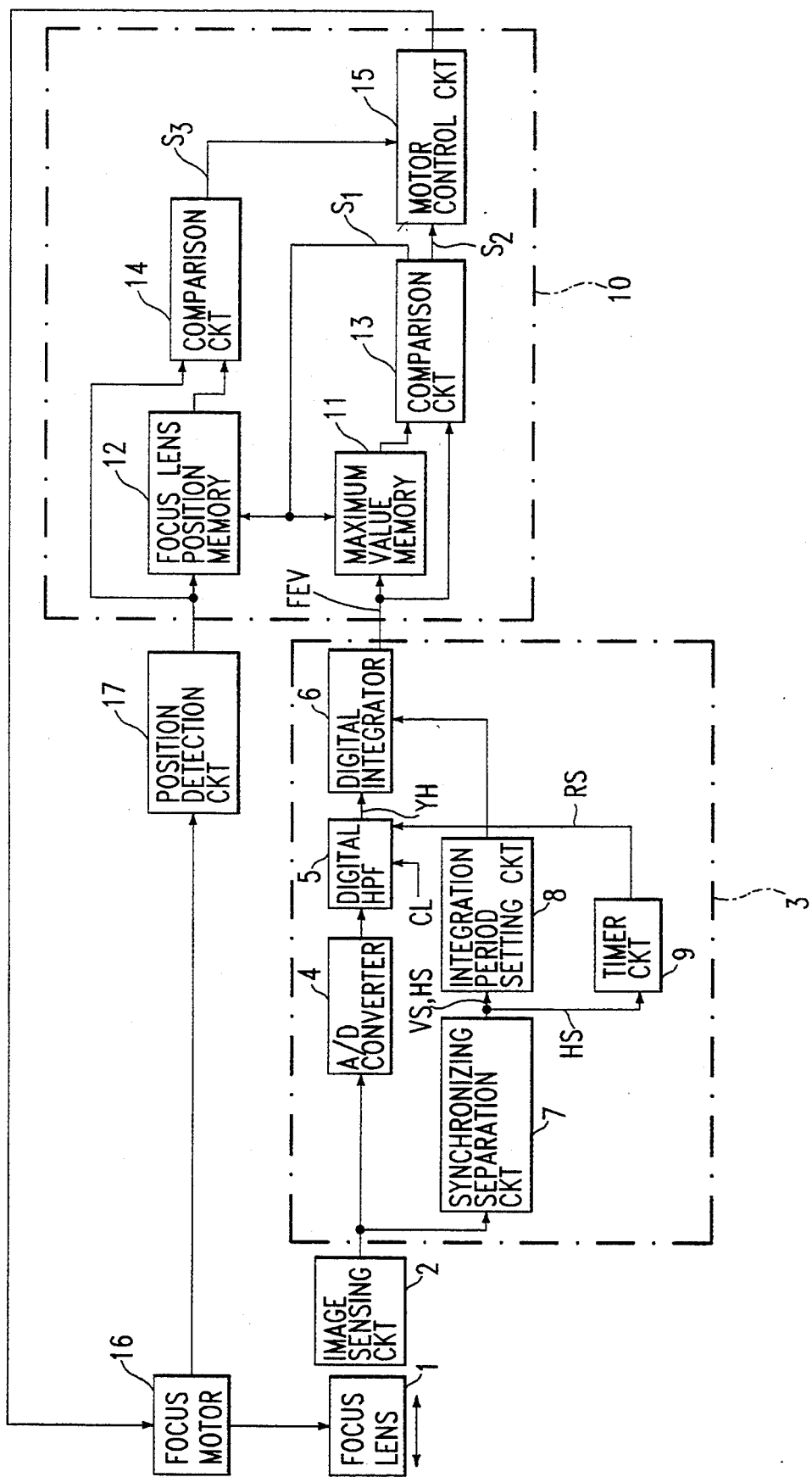
FIG. 2 is a block diagram showing the entire structure of an automatic focusing apparatus including the digital high-pass filter shown in FIG. 1.

FIG. 2 is a block diagram showing the entire structure of an automatic focusing apparatus according to a first embodiment of the invention.

Referring to FIG. 2, the automatic focusing apparatus includes a focus lens 1, and an image sensing circuit 2 including an image sensor such as CCD (Charge Coupled Device). Light from an object comes into the image sensor in image sensing circuit 2 through focus lens 1. Image sensing circuit 2 produces a video signal in response to the incident light.

The automatic focusing apparatus further includes a focus evaluating value generation circuit 3. Focus evaluating value generation circuit 3 includes an analog-digital converter 4, a digital high-pass filter (HPF) 5, a digital integrator 6, a synchronizing separation circuit 7, an integration period setting circuit 8, and a timer circuit 9.

Focus evaluating value generation circuit 3 sequentially generates for every field a focus evaluating value, which takes a maximum value at the in-focus position, in response to a luminance signal in the video signal supplied from image sensing circuit 2.

A/D converter 4 in focus evaluating value generation circuit 3 converts the analog luminance signal supplied from image sensing circuit 2 into a digital signal. Digital HPF 5 extracts only a high frequency component (over 600 KHz) from the digital luminance signal supplied from A/D converter 4 in response to a clock signal CL.

Meanwhile, synchronizing separation circuit 7 separates the luminance signal supplied from image sensing circuit 2 into a vertical synchronizing signal VS and a horizontal synchronizing signal HS.

Integration period setting circuit 8 sets a prescribed integration period-exclusive of a horizontal blanking period in response to vertical and horizontal synchronizing signals VS and HS supplied from synchronizing separation circuit 7. Herein, the integration period is set to a period corresponding to a rectangular focus area set in the center of the image sensed picture plane so that only the high frequency component of the luminance signal in the focus area is extracted.

Digital integrator 6 integrates the level of high frequency component YH extracted by digital HPF 5 during the above-described integration period, in response to a control signal supplied from integration period setting circuit 8, and sequentially supplies the resultant value as a focus evaluating value FEV for every field. The level of high frequency component YH in the luminance signal corresponding to areas other than the focus area, such as areas in the vicinity of the upper and lower ends of the image sensed picture plane, is not integrated.

Figure 3:
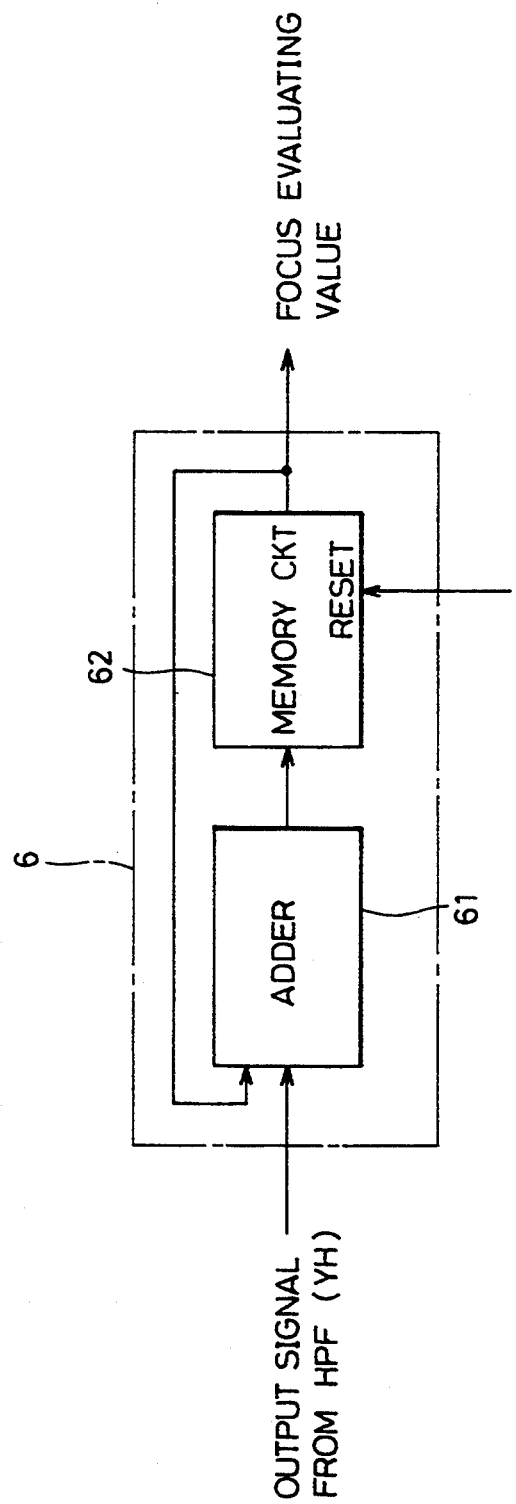
FIG. 3 is a block diagram showing the entire structure of a digital integrator shown in FIG. 2.

FIG. 3 is a block diagram specifically showing the structure of digital integrator 6.

Referring to FIG. 3, digital integrator 6 includes an adder 61, and a memory circuit 62. Adder 61 adds data stored in memory circuit 62 and output signal YH from HPF 5. Memory circuit 62 stores addition data from adder 61.

In such digital integrator 6, addition data periodically obtained from adder 61 is stored in memory circuit 62, and memory circuit 62 is sequentially updated. Memory circuit 62 is reset in a vertical blanking period. Data stored in memory circuit 62, immediately before this circuit is reset, is provided, as output, as a focus evaluating value for a corresponding field.

The addition operation by adder 61 is performed only in an integration period, and its addition cycle matches the data sampling cycle of A/D converter 4.

Digital HPF 5 and timer circuit 9 will be later described in detail.

Referring to FIG. 2, the automatic focusing apparatus further includes a hill-climbing control circuit 10. Hill-climbing control circuit 10 includes a maximum value memory 11, a focus lens position memory 12, comparison circuits 13 and 14, and a motor control circuit 15. The automatic focusing apparatus further includes a focus motor 16 for advancing/retracting focus lens 1 in the direction of its optical axis, and a position detection circuit 17 for adding an amount of revolution of focus motor 16 during normal rotation and subtracting the amount during reverse rotation, thereby detecting the position of focus lens 1.

Herein, advancing/retracting of focus lens 1 may be performed using a piezoelectric element instead of focus motor 16, or alternatively the image sensor itself may be advanced/retracted instead of focus lens 1.

Hill-climbing control circuit 10 drives focus motor 16 so that the focus evaluating value is maximized in response to a focus evaluating value supplied from focus evaluating value generation circuit 3, and focus motor 16 thus advances/retracts focus lens 1 in the direction of its optical axis.

Figure 4:
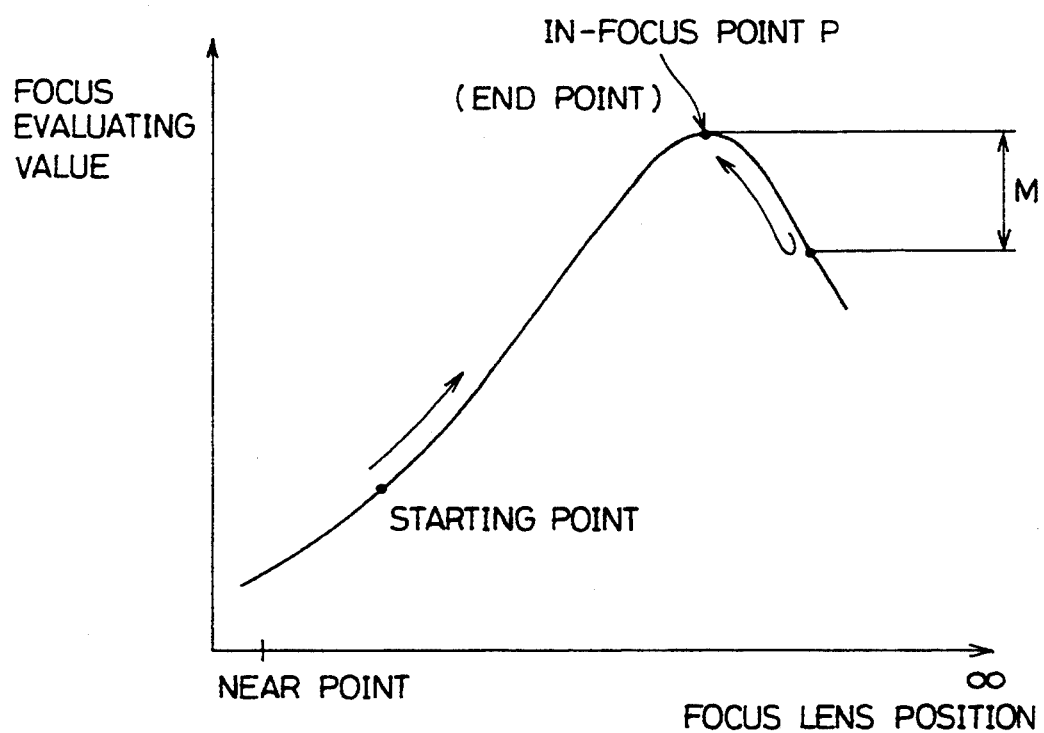
FIG. 4 is a graph showing an operation by a hill-climbing control of the automatic focusing apparatus shown in FIG. 2.

Now, operation of hill-climbing control circuit 10 will be briefly described in conjunction with FIG. 4.

First, motor control circuit 15 moves focus lens 1 in one direction by rotating focus motor 16 so that a focus evaluating value supplied from digital integrator 6 increases. When focus lens 1 is thus moved, the maximum focus evaluating value until then is stored in maximum value memory 11 as a maximum evaluating value.

Comparison circuit 13 also compares the maximum evaluating value and the most recent focus evaluating value, and supplies a control signal S1 to maximum value memory 11 and focus lens position memory 12 if the most recent focus evaluating value is larger than the maximum evaluating value. Maximum value memory 11 updates the maximum evaluating value until then to the most recent focus evaluating value in response to control signal S1.

Focus lens position memory 12 also responds to control signal S1 and stores lens position information from position detection circuit 17. Thus, the lens position information when the maximum evaluating value is obtained is always stored in focus lens position memory 12.

Comparison circuit 13 also detects a decrease of the most recent focus evaluating value from the maximum evaluating value by a threshold value M when the most recent focus evaluating value starts decreasing below peak (in-focus point) P, and supplies a control signal S2 to motor control circuit 15 at the time of detection.

Motor control circuit 15 rotates focus motor 16 in reverse and in response to control signal S2, and monitors a comparison result from comparison circuit 14. Comparison circuit 14 compares the present lens position information from position detection circuit 17 and lens position information stored in focus lens position memory 12, and supplies a control signal S3 to motor control circuit 15 as a comparison result, when focus lens 1 returns to the position stored in focus lens position memory 12. Motor control circuit 15 stops focus motor 16 in response to control signal S3.

Thus, focus lens 1 is ultimately stopped at the position of peak P at which the focus evaluating value is maximized, and the position becomes the in-focus point.

Now, the structure and operation of the above-described digital HPF 5 and the timer circuit 9 will described in detail.

Referring to FIG. 1, digital HPF 5 includes three delay registers 51A, 51B and 51C according to Z-conversion, two amplifiers 52A and 52B, two adders 53A and 53B, and two subtractors 54A and 54B.

Digital HPF 5 further includes two AND gates 55A and 55B, and an inverter 56.

Delay register 51A delays a digital luminance signal supplied from A/D converter 4 by one clock pulse, and applies the delayed signal to subtractor 54A. Subtractor 54A subtracts the digital luminance signal to be supplied to delay register 51A from the output signal from delay register 51A. Delay register 51A and subtractor 54A constitute a finite impulse response (FIR) filter 57.

Adder 53A adds the output signal from subtractor 54A and the output signal from adder 53B. Delay register 51B essentially receives the output signal from adder 53A through AND gate 55A, and delays the output signal by one clock pulse. Delay register 51C essentially receives the output signal from delay register 51B through AND gate 55B and delays the output signal by one clock pulse.

Amplifier 52A amplifies the output signal from delay register 51B with a gain $a_1$. Amplifier 52B amplifies the output signal from delay register 51C with a gain $a_2$. Adder 53B adds the output signal from amplifier 52A and the output signal from amplifier 52B. These two delay registers 51B and 51C, two amplifiers 52A and 52B, and two adders 53A and 53B constitute an infinite impulse response (IIR) filter 58.

Subtractor 54B subtracts from the output of delay register 51C the output signal of delay register 51B to be supplied to delay register 51C through AND gate 55B. Delay register 51C and subtractor 54B constitute an FIR filter.

The transfer function H(Z) of such digital HPF 5 is given as follows:

$$H(Z) = \frac{1 - 2Z^{-1} + Z^{-2}}{1 + a_1 Z^{-1} + a_2 Z^{-2}}$$

Meanwhile, timer circuit 9 produces a reset signal RS after passage of a prescribed time period $T_2$ after the end of a horizontal blanking period, in response to horizontal synchronizing signal HS supplied from synchronizing separation circuit 7. Timer circuit 9 is formed of, for example, a counter circuit.

When an input signal of a constant level continues to be supplied to an FIR filter, the output signal therefrom generally converges to zero.

Accordingly, if a digital luminance signal of a constant level continues to be supplied to FIR filter 57, its output signal converges to zero. At the time, values held in delay registers 51B and 51C in IIR filter 58 also converge to zero.

Accordingly, digital HPF 5 can be reset by setting delay registers 51B and 51C to zero.

Figure 5:
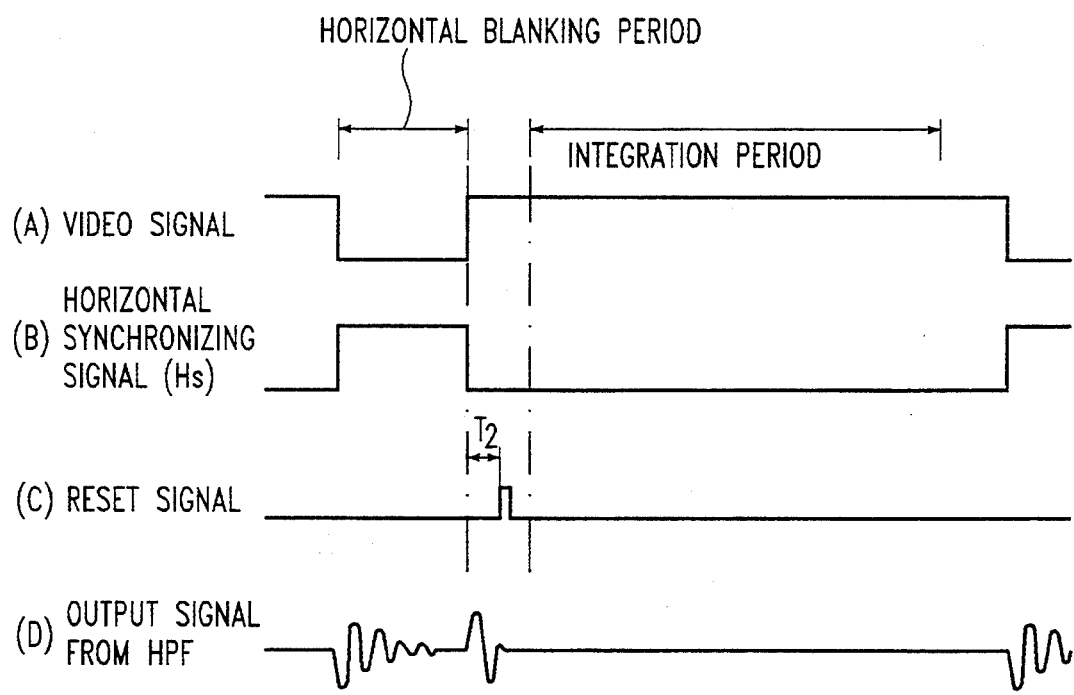
FIG. 5 is a timing chart for use in illustration of essential operation of the automatic focusing apparatus shown in FIG. 2.

FIG. 5 is a timing chart for use in illustration of essential operation of the automatic focusing apparatus according to the first embodiment.

According to the first embodiment, a video signal supplied from image sensing circuit 2 is separated into a vertical synchronizing signal VS and a horizontal synchronizing signal HS by synchronizing separation circuit 7. Horizontal synchronizing signal HS is applied to timer circuit 9, and timer circuit 9 produces reset signal RS in response to horizontal synchronizing signal HS. Reset signal RS is produced after passage of prescribed time period $T_2$ after a falling of horizontal synchronizing signal HS. More specifically, reset signal RS is produced during the period from the end of a horizontal blanking period to initiation of an integration period.

Reset signal RS is applied to AND gates 55A and 55B (see FIG. 1) through inverter 56 in digital HPF 5. When reset signal RS of an H level is applied via inverter 56, to AND gates 55A and 55B, AND gate 55A attains a non-conduction state, the preventing an output signal of adder 53A from being applied to delay register 51B. AND gate 55B also attains a non-conduction state, and thus prevents an output signal of delay register 51B from being applied to delay register 51C.

Therefore, if reset signal RS at H level is applied, via inverter 56, to AND gates 55A and 55B, zero is set in delay registers 51B and 51C. Thus, the level of the output signal from HPF 5 is forced to zero, and hence ringing disappears. Accordingly, part of the ringing will not be integrated by digital integrator 6 as a pseudo signal, and accurate automatic focusing operation can be performed.

Although in the first embodiment zero is set both in delay registers 51B and 51C, only delay register 51B may be set to zero. In this case, setting delay register 51B to zero necessarily sets delay register 51C to zero, and therefore digital HPF is also reset.

Note that in the first embodiment, hill-climbing control circuit 10, focus motor 16 and position detection circuit 17, all as shown in FIG. 2 constitute control means for controlling the position of focus lens 1 relative to image sensing circuit 2 in the direction of optical axis so that the focus evaluating value is maximized.

Timer 9, AND gates 55A and 55B, and inverter 56 in digital HPF 5 constitute reset means for resetting digital HPF 5 during the period from the end of a horizontal blanking period to initiation of an integration period.

Embodiment 2

Figure 6:
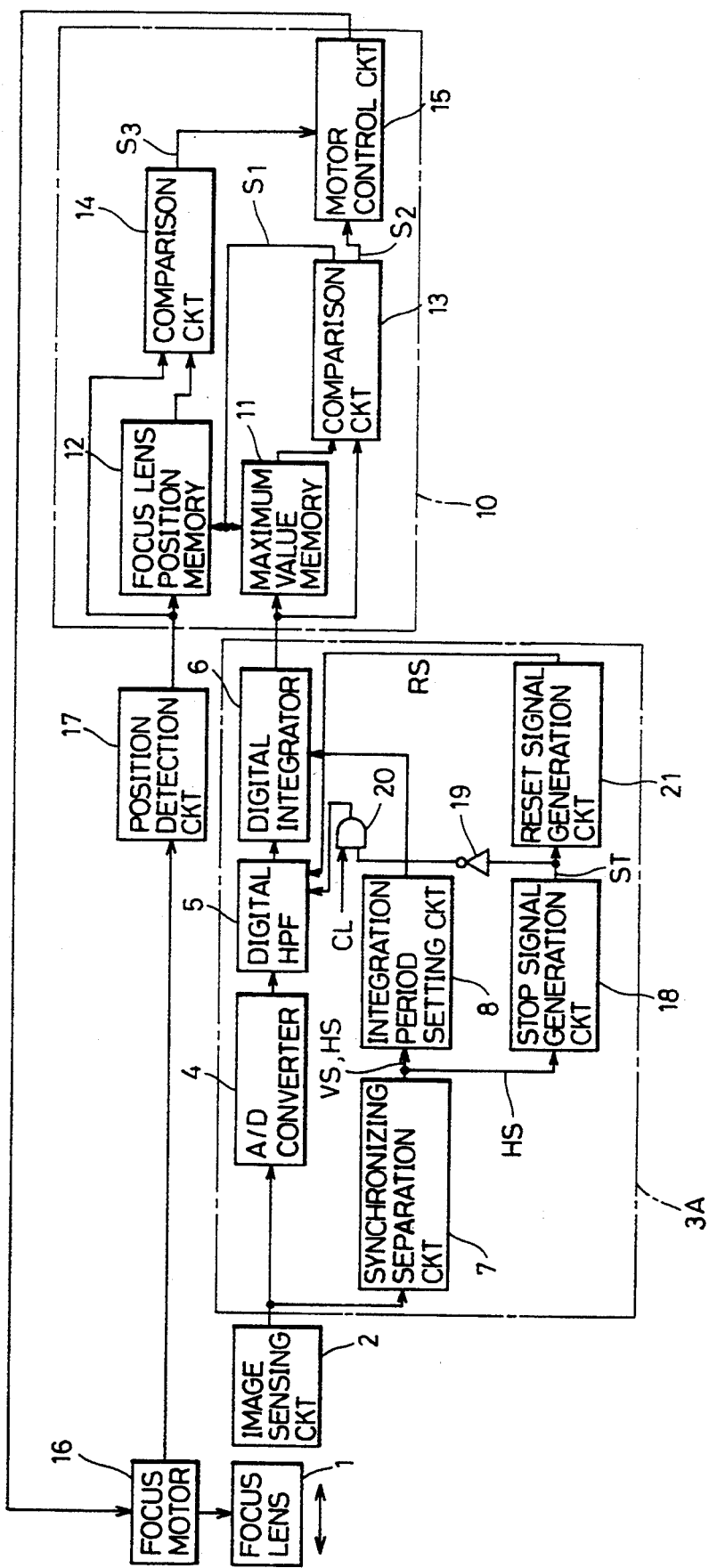
FIG. 6 is a block diagram showing the entire structure of an automatic focusing apparatus according to a second embodiment of the invention.

FIG. 6 is a block diagram showing the entire structure of an automatic focusing apparatus according to a second embodiment of the invention. The second embodiment shown in FIG. 6 is different from the automatic focusing apparatus according to the first embodiment shown in FIG. 2 in the following points, and description of portions in common is omitted.

Referring to FIG. 6, a focus evaluating value generation circuit 3A in the automatic focusing apparatus includes a stop signal generation circuit 18, an inverter 19, an AND gate 20, and a reset signal generation circuit 21.

Stop signal generation circuit 18 generates a stop signal ST at an H level during a prescribed stopping period including a horizontal blanking period, in response to rising and falling edges of a horizontal synchronizing signal HS supplied from a synchronizing separation circuit 7. Reset signal generation circuit 21 generates a reset signal RS at an H level in response to a falling edge of stop signal ST supplied from stop signal generation circuit 18.

Figure 7:
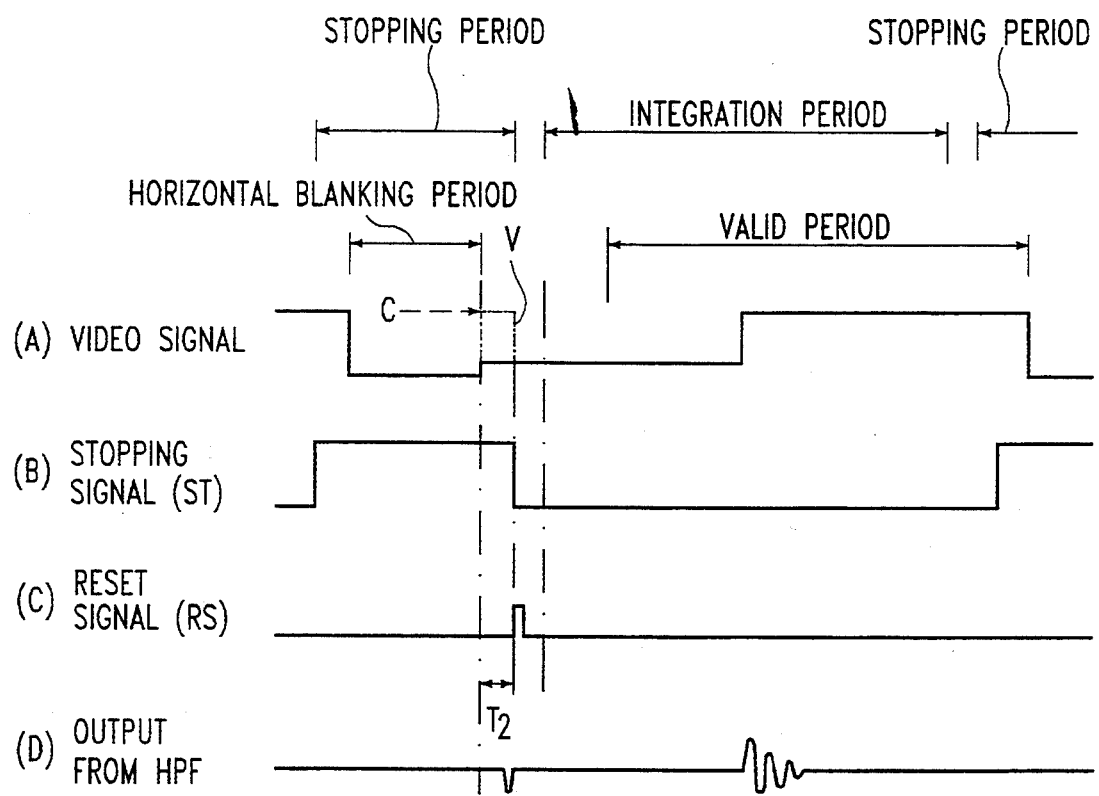
FIG. 7 is a timing chart for use in illustration of essential operation of the automatic focusing apparatus shown in FIG. 6.

FIG. 7 is a timing chart-for use in illustration of essential operation of the automatic focusing apparatus according to the second embodiment.

According to the second embodiment, stop signal ST is generated by stop signal generation circuit 18 in response to a falling edge and a rising edge in a video signal due to a horizontal blanking period. Stop signal ST attains an H level during a prescribed stopping period including a horizontal blanking period. More specifically, stop signal ST rises slightly before initiation of a horizontal blanking period and falls slightly after the end of the horizontal blanking period.

Stop signal ST is applied to AND gate 20 through inverter 19. Thus, AND gate 20 attains a non-conduction state, and prevents application of a clock signal CL to digital HPF 5. Digital HPF 5 stops operation during a prescribed stopping period.

Meanwhile, stop signal ST is also applied to reset signal generation circuit 21, and reset signal generation circuit 21 produces a reset signal RS at an H level simultaneously with a falling edge of stop signal ST. Reset signal RS is produced during the period from the end of the horizontal blanking period to initiation of the integration period, more specifically during the period from the end of the stopping period to initiation of an integration period.

Reset signal RS, similarly as in the first embodiment, is applied to AND gates 55A and 55B (see FIG. 1) through inverter 56 in digital HPF 5, which resets digital HPF 5. Therefore, the ringing created at initiation of operation of digital HPF 5 disappears. Accordingly, part of such ringing will not be integrated by digital integrator 9 as a pseudo signal, and therefore accurate automatic focusing operation can be performed.

Furthermore, as illustrated in FIG. 7, if a video signal sharply rises from a black level to a white level based on the pattern of an object in the image during the integration period, a high frequency component due to the rising is extracted by HPF 5 and applied as output. Then, the level of the high frequency component is integrated by digital integrator 9 and sequentially supplied to hill-climbing control circuit 10 as a focus evaluating value for every field.

According to the second embodiment, the operation of digital HPF 5 is stopped during the period other than the integration period, and therefore power consumption thereof can be reduced. Particularly, since no ringing is created at end of the stopping period, the stopping period can be prolonged.

Note that in the second embodiment as shown in FIG. 6, stop signal generation circuit 18, inverter 19, and AND gate 20 constitute stopping means for stopping the operation of digital HPF 5 during a prescribed stopping period including a horizontal blanking period.

Reset signal generation circuit 21 (see FIG. 6), inverter 56 and AND gates 55A and 55B (see FIG. 1) in digital HPF 5 constitute reset means for resetting digital HPF 5 during the period from the end of a stopping period to initiation of an integration period.

Embodiment 3

Figure 8:
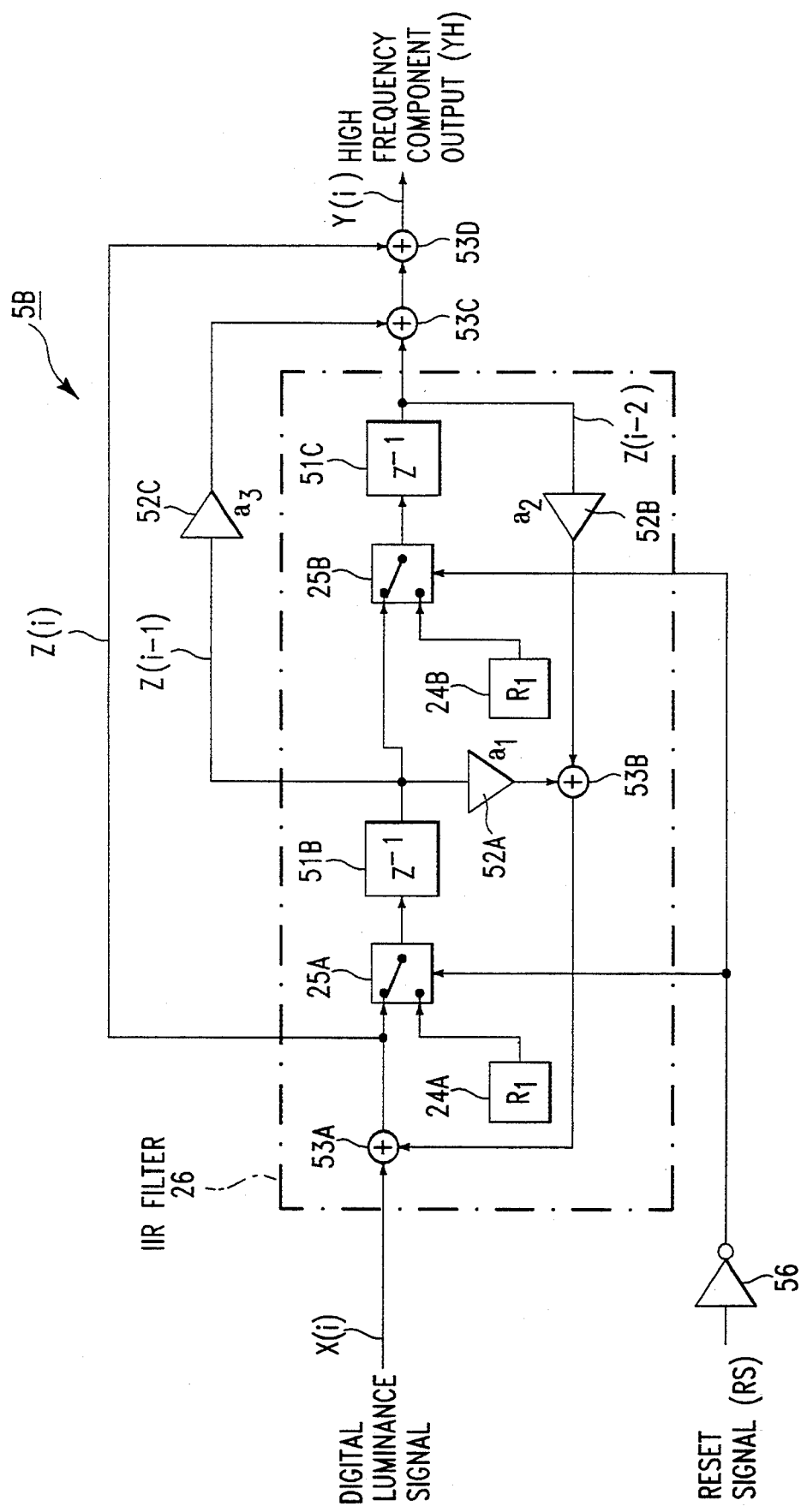
FIG. 8 is a block diagram showing the entire structure of a digital high-pass filter in an automatic focusing apparatus according to a third embodiment of the invention.

FIG. 8 is a block diagram showing the entire structure of a digital HPF in an automatic focusing apparatus according to a third embodiment of the invention.

Referring to FIG. 8, digital HPF 5B, similar to the above-described digital HPF 5, includes two delay registers 51B and 51C, two amplifiers 52A and 52B, and two adders 53A and 53B.

Digital HPF 5B further includes two setting registers 24A and 24B, and two selectors 25A and 25B in place of AND gates 55A and 55B in digital HPF 5 described above (and shown in FIG. 1).

Delay registers 51B and 51C, amplifiers 52A and 52B, adders 53A and 53B, setting registers 24A and 24B, and selectors 25A and 25B (all shown in FIG. 8) constitute an IIR filter 26.

Setting registers 24A and 24B hold specified values $R_1$ and $R_2$ which will be described later. Selector 25A selects an output signal from adder 53A or the specified value $R_1$ of delay register 24A in response to reset signal RS applied through inverter 56. Selector 25B selects an output signal from delay register 51B or the specified value $R_2$ of delay register 24B in response to reset signal RS applied through inverter 56.

Digital HPF 5B further includes an amplifier 52C and two adders 53C and 53D.

Amplifier 52C amplifies an output signal from delay register 51B with a gain $a_3$. Adder 53C adds an output signal from delay register 51C and an output signal from amplifier 52C. Adder 53D adds an output signal from adder 53C and an output signal from adder 53A to be applied to delay register 51B through selector 25A.

Delay register 51C and adder 53C constitute an FIR filter. Delay register 51B and adder 53D constitute an FIR filter.

Digital HPF 5B, however, unlike digital HPF 5 described above, does not include an FIR filter in a preceding stage to IIR filter 26. Therefore, if a constant level digital luminance signal is applied to digital HPF 5B, the values of delay registers 51B and 51C in IIR filter 26 will not converge to zero.

Note that since delay register 51C and adder 53C, and delay register 51B and adder 53D constitute two FIR filters, when a constant level digital luminance signal is supplied to digital HPF 5B, its output signal YH should converge to zero.

Now, specified values to which the values of delay registers 51B and 51C should converge when a constant level digital luminance signal is applied to digital HPF 5B will be described by way of examples.

Assume that the input signal of adder 53A, in other words a digital luminance signal supplied from A/D converter 4 is X(i), and its output signal Z(i). Assume that the output signal of adder 53D, in other words a high frequency luminance signal YH output from digital HPF 5B is Y(i).

Then, the output signal of delay register 51B is expressed as Z(i−1), and the output signal of delay register 51C is expressed as Z(i−2). This establishes the following expressions.

$$Z(i) = X(i) + a_1 Z(i-1) + a_2 Z(i-2)$$

$$Y(i) = Z(i) + a_3 Z(i-1) + Z(i-2)$$

If, as illustrated in FIG. 7, the starting point of an integration period occurs before the starting point of a valid period of a video signal, in other words if integration is initiated before a valid video signal is supplied, signal X(i) input to digital HPF 5B is at a predetermined set up value during the period in which a clock signal is stopped.

If, for example, the gains $a_1$, $a_2$, and $a_3$ of amplifiers 52a, 52b, and 52c are 1.5, −0.625, and −2.0, respectively, and the input signal X(i) of adder 53A at set up value C (i=0−∞), the following expression is given from the above expressions.

$$Z(i-1) = Z(i-2) = 8C$$

As can be seen from the expression, when set up value C of constant level is supplied the values of delay registers 51B and 51C converge to the value eight times as large as set up value C.

Accordingly, the above-described value 8C is previously set as a specified value in registers 24A and 24B, and when setting registers 24A and 24B are selected by selectors 25A and 25B, in response to reset signal RS from reset signal generation circuit 21, specified value 8C is set in delay registers 51B and 51C. Thus, the state of IIR filter 26 equals the state when constant level input signal X(i) is applied and its output signal Z(i−2) converges.

Stated differently, setting a specified value 8C in delay registers 51B and 51C, Z(i−2), to be produced when IIR filter 26 is supplied with constant level input signal X(i) and converges during the period from the end of a horizontal blanking period to the starting point of an integration period, results in resetting of digital HPF 5B.

Therefore, no ringing occurs at the end of a stopping period as is the case with the second embodiment. Accordingly, part of ringing will not be integrated by digital integrator 9 as a pseudo signal, and accurate automatic focusing operation can be performed.

Unlike the third embodiment, if an FIR filter is not provided in a preceding stage to IIR filter 26, an output signal, to be produced when IIR filter 26 is supplied with a constant level input signal and converges, may be set as a specified value in delay registers 51B and 51C during the period from the end of a horizontal blanking period to the starting point of an integration period.

Embodiment 4

Figure 9:
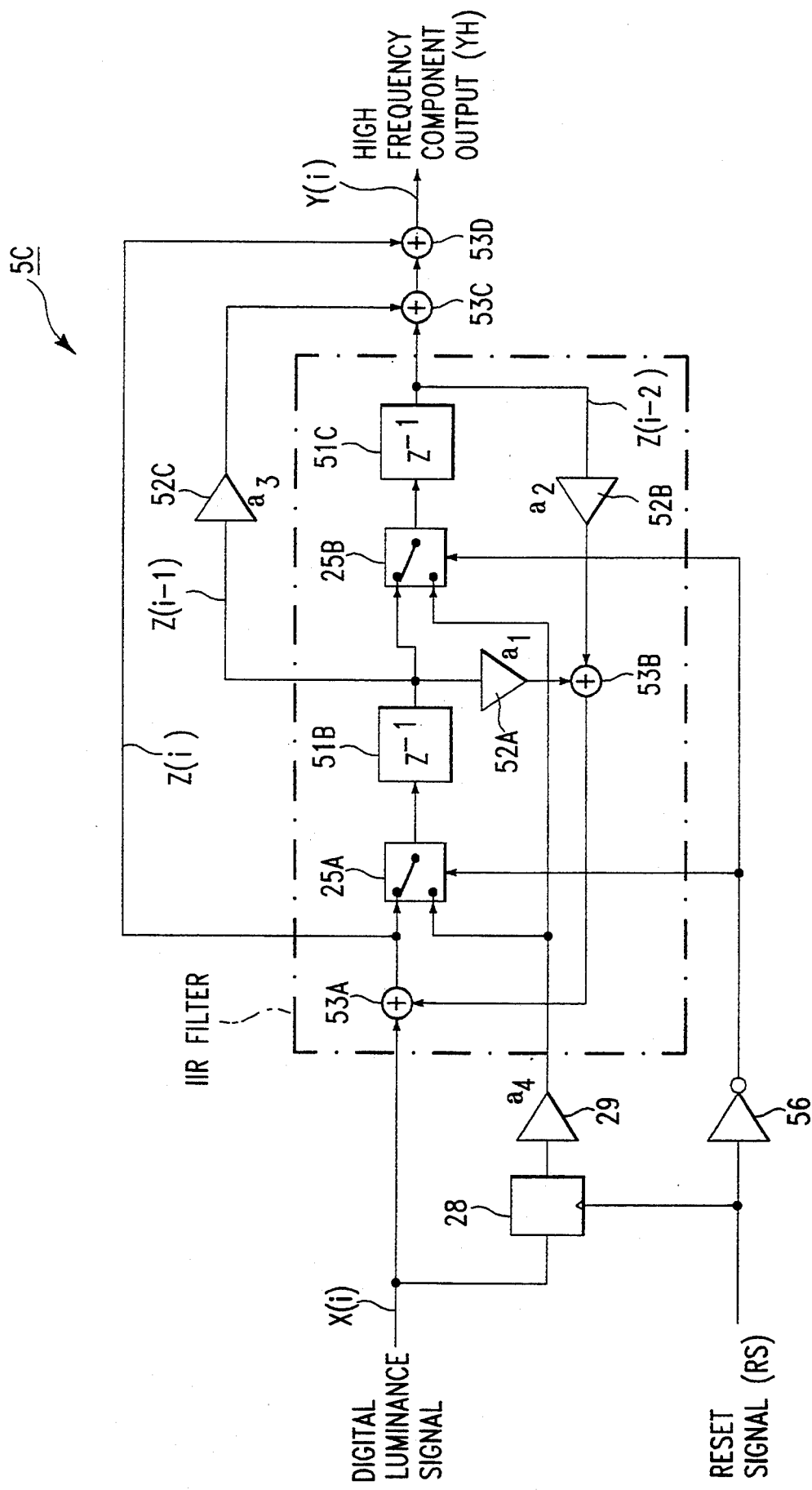
FIG. 9 is a block diagram showing the entire structure of a digital high-pass filter in an automatic focusing apparatus according to a fourth embodiment of the invention.

FIG. 9 is a block diagram showing the entire structure of a digital HPF in an automatic focusing apparatus according to a fourth embodiment of the invention.

Referring to FIG. 9, digital HPF 5C includes a latch circuit 28 and an amplifier 29 in place of setting registers 24A and 24B in the above-described digital HPF 5B.

Latch circuit 28 latches a digital luminance signal in response to a rising of reset signal RS, and applies the luminance signal to amplifier 29. Amplifier 29 amplifies the applied luminance signal with a gain $a_4$ (herein, gain $a_4$ is 8), and applies the amplified signal to delay registers 51B and 51C through selectors 25A and 25B.

In the third embodiment, since a video signal is set to a predetermined set up value C during the period in which a clock signal is stopped, only one kind of specified value can be set in delay registers 51B and 51C.

If, however, the video signal is not set to such a set up value, a plurality of different specified values could be set in delay registers 51B and 51C.

In the fourth embodiment, a value eight times as large as the level of a digital luminance signal level is always set in delay registers 51B and 51C in response to reset signal RS, and therefore even if an input signal to digital HPF 5C is not the predetermined set up value, there will be no ringing at the end of the clock signal stopped period. Accordingly, part of the ringing will not be integrated as a pseudo signal, and therefore accurate automatic focusing operation can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching focus to an object, comprising:
   a focusing lens;
   image sensing means responsive to incident light reflected from said object and passed through said focusing lens for sensing an image and producing a video signal;
   high-pass filter means for extracting a high frequency component in said video signal produced by said image sensing means;
   integrating means for integrating, during a field period of the sensed image, a level of said high frequency component extracted by said high-pass filter means during a prescribed integration period but excluding a horizontal blanking period so as to produce an integrated value and sequentially supplying the integrated value for every field as a focus evaluating value, wherein said focus evaluating value reaches a maximum value at an in-focus position and wherein, within the field period, the integration period occurs after the horizontal blanking period,
   control means, responsive to said focus evaluating value supplied from said integrating means, for controlling a position of said focusing lens, relative to said image sensing means, in a direction of an optical axis so that said focus evaluating value is maximized; and
   resetting means for resetting said high-pass filter means during a period, within said field period, from an end of said horizontal blanking period to a starting point of said integration period.

2. An automatic focusing apparatus as recited in claim 1, wherein:
   said high-pass filter means comprises an infinite impulse response filter having at least one delay register and responsive to an input signal for producing an output signal, and
   said resetting means sets, as a specified value in said delay register, said output signal to be produced when said infinite response filter is supplied with said input signal of constant level and converges during the period from the end of said horizontal blanking period to the starting point of said integration period, thereby resetting said high-pass filter means.

3. An automatic focusing apparatus as recited in claim 2, wherein:
   said high-pass filter means further includes a finite impulse response filter for supplying said input signal to said infinite impulse response filter, and
   said resetting means sets zero as said specified value in said delay register.

4. An automatic focusing apparatus for automatically matching focus to an object, comprising:
   a focusing lens;
   image sensing means responsive to incident light reflected from said object and passed through said focusing lens for sensing an image and producing a video signal;
   high-pass filter means for extracting a high frequency component in said video signal produced by said image sensing means;
   stopping means for stopping operation of said high-pass filter means during a prescribed stopping period including a horizontal blanking period;
   integrating means for integrating, during a field period of the sensed image, a level of said high frequency component extracted by said high-pass filter means during a prescribed integration period but excluding said stopping period so as to produce an integrated value and sequentially supplying the integrated value for every field as a focus evaluating value, wherein said focus evaluating value reaches a maximum value and an in-focus position and wherein, within the field period, the integration period occurs after the stopping period;
   control means, responsive to said focus evaluating value supplied from said integrating means, for controlling a position of said focusing lens, relative to said image sensing means, in a direction of an optical axis so that said focus evaluating value is maximized; and
   resetting means for resetting said high-pass filter means during a period from an end of the stopping period to a starting point of said integration period.

5. An automatic focusing apparatus as recited in claim 4, wherein:
   said high-pass filter means comprises an infinite impulse response filter having at least one delay register and responsive to an input signal for producing an output signal, and
   said resetting means sets, as a specified value in said delay register, said output signal to be produced when said infinite impulse response filter is supplied with said input signal of constant level and converges during the period from the end of said stopping period to the starting point of said integration period, thereby resetting said high-pass filter means.

6. An automatic focusing apparatus as recited in claim 5, wherein:
   said high-pass filter means further comprises a finite impulse response filter for supplying said input signal to said infinite impulse response filter, and
   said resetting means sets zero as said specified value in said delay register.

* * * * *